Jan. 20, 1953  N. L. OATES  2,625,708
METHOD OF LOCATING FISH FOR BEHEADING
Filed Oct. 29, 1947  4 Sheets-Sheet 1
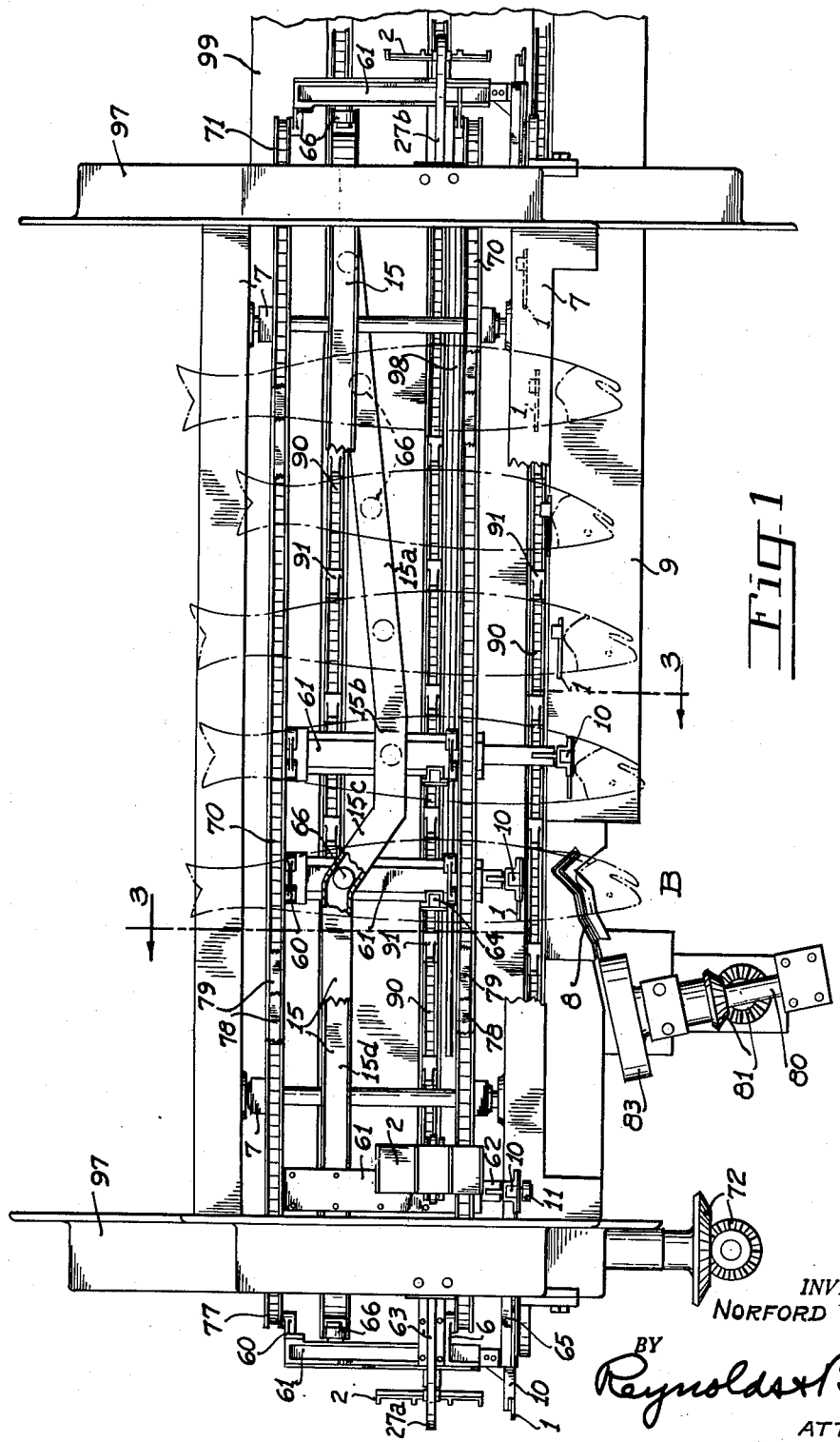
INVENTOR.
NORFORD L. OATES
BY
Reynolds+Beach
ATTORNEYS Jan. 20, 1953

N. L. OATES 2,625,708

METHOD OF LOCATING FISH FOR BEHEADING

Filed Oct. 29, 1947

INVENTOR.
NORFORD L. OATES

BY
*Reynolds & Beach*
ATTORNEYS

Jan. 20, 1953 N. L. OATES 2,625,708
METHOD OF LOCATING FISH FOR BEHEADING
Filed Oct. 29, 1947 4 Sheets-Sheet 4
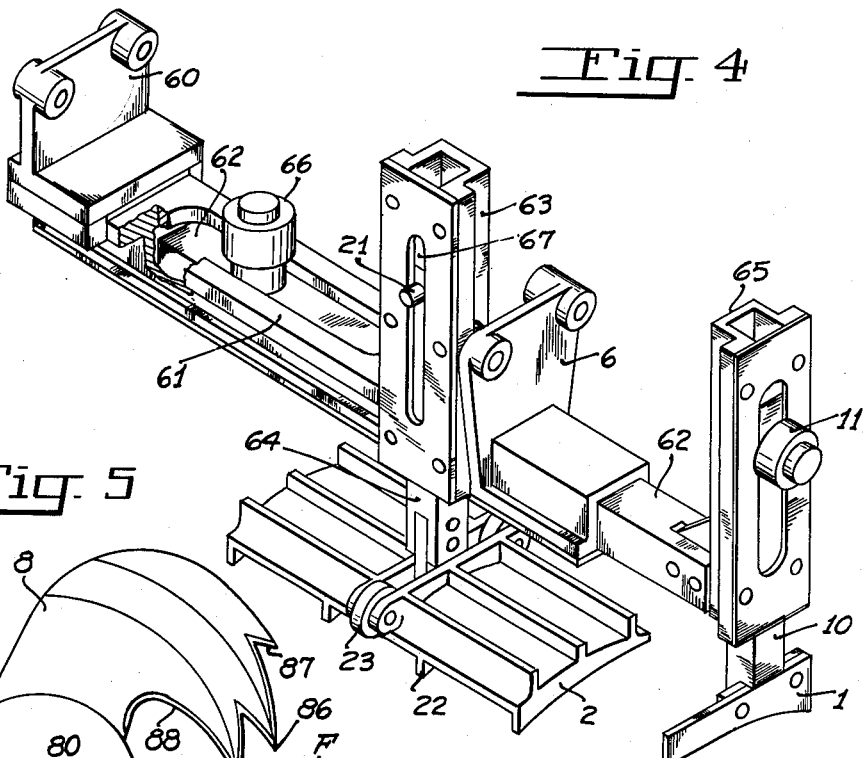
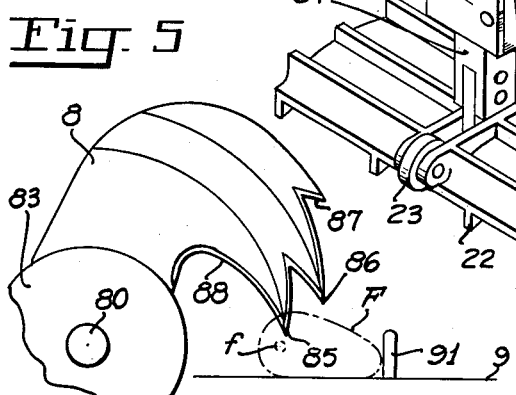
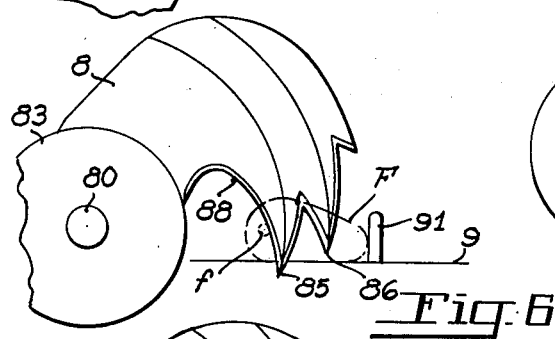
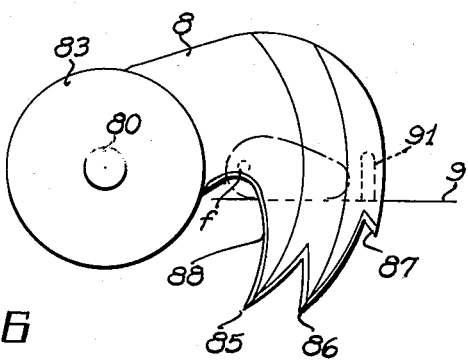
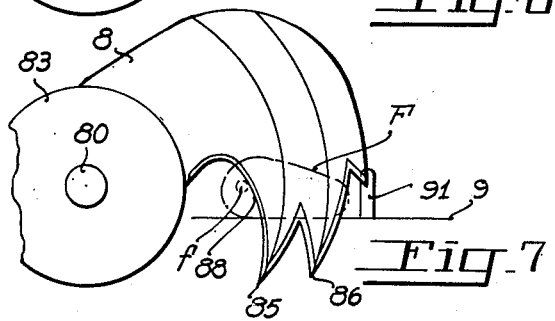
INVENTOR.
NORFORD L. OATES
BY
Reynolds + Beach
ATTORNEYS Patented Jan. 20, 1953

2,625,708

UNITED STATES PATENT OFFICE 2,625,708

METHOD OF LOCATING FISH FOR BEHEADING

Norford L. Oates, Seattle, Wash., assignor to Smith Cannery Machines Company, Seattle, Wash., a corporation of Washington Application October 29, 1947, Serial No. 782,865

8 Claims. (Cl. 17—45)

Accuracy in locating fish—salmon, usually—for beheading by a beheading knife preparatory to the cleaning, dressing, and canning of the fish, becomes increasingly difficult as the tempo of the various operations increases. A feed rate of 50 to 60 fish a minute was considered, in the recent past, to be quite a satisfactory rate, for the canning machinery could not absorb fish at a more rapid rate, but technological advances in canning machinery have entailed and permitted corresponding speeding up of the butchering operations, until presently a feed rate in the vicinity of 120 fish a minute is expected and required, and rates up to 150 fish a minute are readily attainable.

Yet accuracy in the beheading operation becomes increasingly necessary, as the tempo of feeding increases, and as the value of the canned fish increases. The severance of as little as ⅛" of usable flesh with the head, in 800 fish represents a waste of 100 inches of the finest and largest cuts in the fish, which, translated into money values and multiplied by the thousands of fish canned annually by each individual cannery, represents an annual loss to each cannery of thousands of dollars. On the other hand, the inclusion in the pack of any appreciable portion of the pectoral girdle, or of the gill or gill casing, all of which lie immediately ahead of the fleshy neck of the fish, downgrades the entire pack, and this too represents a loss to the cannery of thousands of dollars. The beheading cut must be made immediately behind the pectoral girdle, to include substantially none of the bony structure, and to utilize substantially all the good flesh.

Omitting for the moment consideration of the difficulties of attaining such extreme accuracy which arise from the increased tempo of operations, other difficulties arise, and have always been present, from causes which, at slower speeds, were not so difficult to cope with, but which at the greater speeds increase greatly the probability of malfunctioning. Obviously, the fish being processed in any given day's run will vary in size and weight, and sometimes in species, and no such machine, at any speed, can be varied to accommodate precisely each individual fish, but must be adjusted and set to handle the general daily average, and must adapt itself more or less accurately to individual fish. But fish vary also in condition; freshly caught fish will be firm of flesh and not unduly flexible, and their skin will cling closely to the flesh, whereas fish longer out of water will be flabbier, softer, and the skin will tend to gather in folds when pinched, and to pull the distant flesh into a curve. Frozen or heavily iced fish, regardless of their freshness, may tend to rigidity, and are difficult to direct and handle by the usual means. All fish are slippery and slimy, increasingly so with age, and fish once set in motion may slide farther than is desired, unless restrained; this slime, with loosened scales, penetrates all parts of a fish-dressing machine, and instead of facilitating movement may "freeze" parts against relative movement. Paradoxically, slippery as they are, such fish once at rest upon a feed table surface seem glued thereto, and are most difficult to set again in motion, and the effort distorts their flesh.

Add now the further difficulties attendant upon increased speed, and the ideal of accuracy is much more difficult to attain. A slippery fifteen or twenty pound fish can acquire such momentum in a slight movement rapidly imparted, or imperfectly aimed, that it will tend to slide in the wrong direction, or materially past its intended positioning. If soft, or if stuck to the table, it may tend to bend or otherwise lie askew. Adjustments which will compensate for the flabbiness of the general run of fish will throw a firmer, stiffer fish far out of correct position. An extremely rigid fish may be thrown clear of the machine; an extremely soft fish may be doubled up when pushed.

Feed tables, and mechanism to locate an advancing fish accurately with respect to a beheading knife at a definitely located beheading point, by engagement of the fish behind its pectoral girdle as a gauge point, have been devised heretofore, and examples thereof may be found in my Patents Nos. 2,507,808, 2,507,809, 2,507,810, all issued May 16, 1950, and 2,546,346, issued March 27, 1951, all of which were copending with this application. Each was useful under conditions and feed rates then currently prevailing, and each includes principles still useful, and herein employed, especially as pertains to location by engaging behind the pectoral girdle. Under present conditions and feed rates the principles and structure illustrated by the invention herein shown, described, and claimed will be found much better suited to the desired ends than such earlier inventions.

Generally speaking, then, the object of the present invention is to provide a method for locating fish while they rest upon and advance along a feed table, into correct registry with a beheading knife, while operating at high speed and under operating conditions always present but thereby aggravated, whereby most reliably and accurately to locate the fish in a manner to avoid, in the highest practical degree, any economic waste of a valuable food product.

The present invention is particularly concerned with the cooperation between the several operations of advancing the fish individually, shifting it snoutwardly into registry with the beheading knife, holding back the fish during such shifting, and holding down the fish during the actual beheading operation.

Somewhat more specifically, since the standard feed table, by belly-engaging lugs, advances individual fish from a feed end towards and past a rotative beheading knife, while the fish lie flatwise upon the table, back forward, transversely of their direction of advance, and with their heads or snouts all towards that side of the feed table where the rotative knife defines a beheading point by its movement past the plane of the table and through the position of each successive fish in timed relationship to the arrival at such point of each such fish, it is one of the primary objects of this invention to insure (a) the arrival at the beheading point of each fish in accurate position, with its head not too far advanced nor lagging too far, not drooping too much nor yet upstanding, and not too far snoutward nor too far tailward, notwithstanding differences in their size, species, or condition, and regardless of the speed of operation; (b) the restraint of fish the movement of which is difficult to control under such conditions, so that in adjusting their positions they will not move too far nor yet too slightly, or be otherwise distorted from proper position; (c) the supplemental or continuing restraint of such fish against displacement from position during and following the beheading operation, notwithstanding its continued advance and the severe displacing forces imposed by impact of the somewhat massive and rapidly rotating beheading knife, while at the same time permitting some departure of the fish from its engagement with the feed means, in order to insure the best severance of the head; and (d) the avoidance of sticking of a fish, by never permitting it to come to rest upon any surface.

Even more specifically, it is an object to control snoutward positioning movement of the advancing fish as it is shifted into correct registry with the beheading point, while likewise, and particularly subsequently to completion of such snoutward movement, holding down the fish and restraining its displacement by the knife, by two separate but coordinated devices, which in turn are coordinated with the mechanism whereby the fish is so shifted, advanced, and beheaded.

With respect to effective and accurate severance of the fish's head, particularly at the throat and along the neck, it is an object so to shape and coordinate the movement of the knife relative to the path and rate of advance of the fish, that distortion or displacement of the fish by conflicting forces is avoided or when not wholly avoidable is turned to advantage, and the steady advance of the fish-advancing means is uninterrupted, and further, so that severance at the soft throat is assured.

Many other objects will appear as this specification progresses, and enumeration thereof at this time appears superfluous.

This invention concerns the novel arrangement of the several parts of a feeder table for such use, and certain novel parts per se, and also the novel method of feeding or locating a fish so fed, all as shown in the drawings, as described herein, and as defined in the claims.

Herein the invention is disclosed, by way of example, embodied in a typical and presently preferred form of machine, but it will be understood that no limitation thereto is intended, nor any limitation other than as may be required by the claims in the light of this specification, of which the drawings are a part.

Figure 1 is a plan view, partly broken away, of a feed table incorporating the present invention, and Figure 2 is a side elevation thereof on a larger scale, also broken away in part.

Figure 4 is an isometric view of an individual hoe and hold-down mount, in part broken away.

Figure 3:
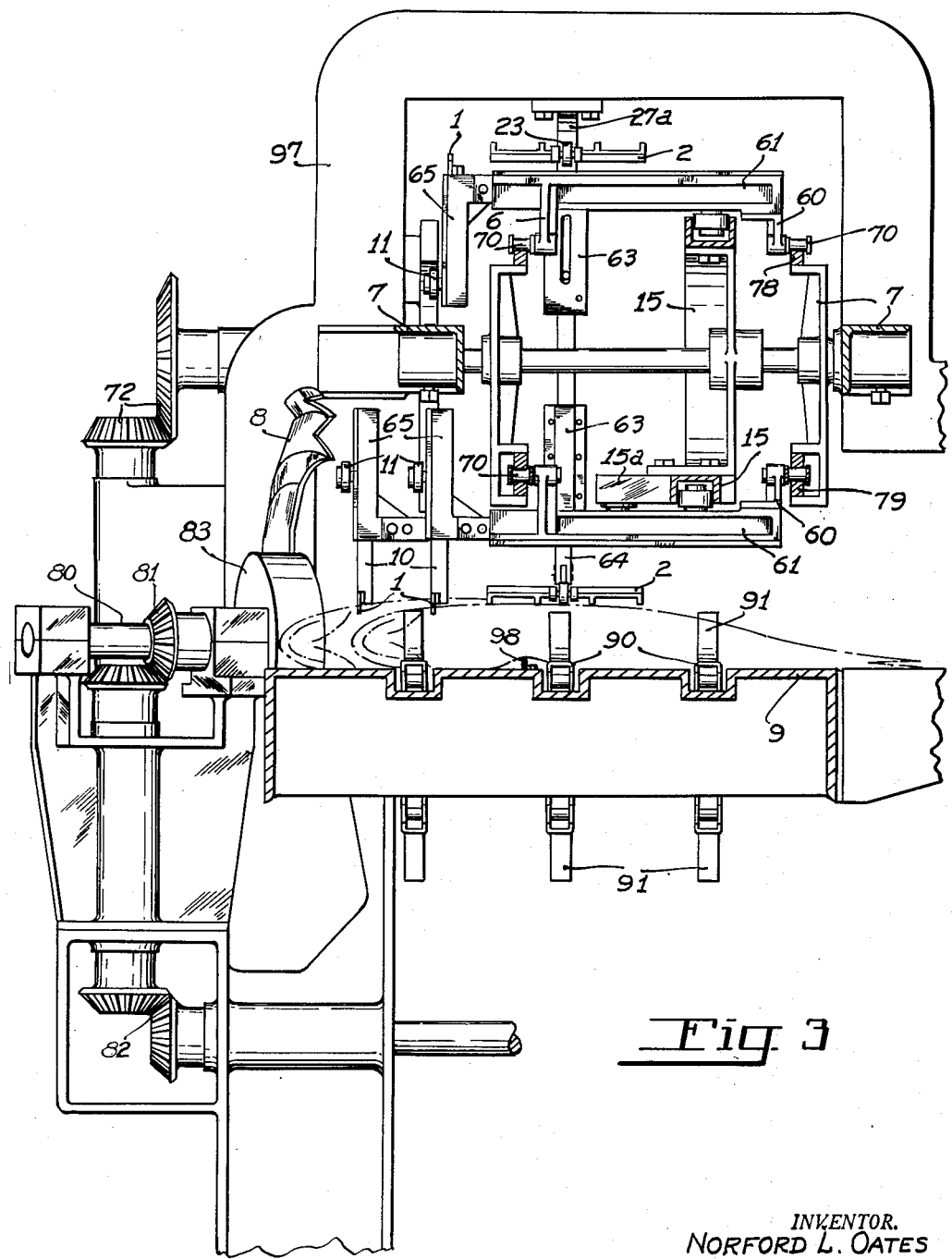
Figure 3 is a cross section on the line 3—3 of Figure 1 through the feed table, looking towards the beheading point from the feed end.

Figures 5, 6, 7, and 8 are successive diagrammatic views of the knife and its engagement with a fish, and of the instantaneous relationships of the fish to its fish-advancing means as affected by the engagement of the knife with the fish.

It may be helpful, in advance of detailed description of the machine and the method, to explain the general principle of operation. As in most of the devices of my copending applications, individual fish are supported flatwise upon a table, with their snouts all at the same side of the table, and upstanding lugs continuously traveling lengthwise of the table push the fish, at proper spacing, and in transverse disposition, along the table from the feed end 99 at the right in Figures 1 and 22 to the delivery end, with never a pause. Each fish has its back forward and its belly rearward during such advance, the belly being engaged by the lugs upstanding from feed chains just below the surface of the table. During their advance the individual fish pass a beheading point, where a knife, usually continuously rotatable in synchronism with the fish-advancing means, and properly contoured to cut immediately behind and close to the pectoral girdle, passes through the plane of the table and the position of a fish, to define a beheading point. The advance of each fish is so precisely timed, with relation to the rotation of the knife, and the knife is so contoured, with relation to the fish's position at the instant at impact, that the contoured knife will sever the fish's head from the body along a line which is very close to the fish's pectoral girdle, and this regardless of its size, providing only that the fish is disposed properly in the direction of its own length, that is, transversely of the feed table.

In order to accomplish this disposition, since it is not possible at the required rate of feed to position it accurately by hand, were it safe to attempt manual positioning, which it is not, each fish is engaged by fish-locating means, one type whereof takes the form of a hoe-like fish-locating member, which rests upon and depresses its skin behind the pectoral girdle, and then, by movement toward its snout, without interruption of its advance along the table, engages the bony excrescence which defines or is part of the pectoral girdle, and thereby drags the fish forwardly or snoutward, until its pectoral girdle is precisely located in correct registry with the beheading point.

In general, such results are capable of accomplishment by certain of the devices described in the copending applications. However, it has been discovered, for example, that flabby fish, or fish that do not slide as easily as others, or fish that are not exactly correctly located with relation to their feed lugs, or fish that stick because they have been permitted to come to rest upon a supporting platform or the feed table, may tend to bow, or to pull, so that the fish's backbone is not straight and thereby the head may lag, or in some instances may be projected forwardly of its correct position with relation to the body of the fish, so that the knife does not correctly enter the fish, but includes some portion of the lower or the upper part of the bony structure in the vicinity of the neck, and cuts off more of the flesh at the opposite side than is desirable. In another case, if the fish happens to be stiff, it may be found that the fish, in being moved, is given sufficient momentum as to cause it to move too far snoutward, and there have been instances when the fish, upon its engagement by the knife, has slipped away from the knife, or has been flipped up by the knife, spoiling the accuracy of the cut and displacing the fish so that it does not come into proper position for further operation after beheading. To avoid each such difficulty, presser means are provided, and while presser means have been proposed heretofore in connection with such beheading means and feed means, the manner of cooperation of such presser means, with the hoe-like means, and with the feed means and beheading knife, are different in this application from such means as previously disclosed. In particular, the presser means herein have two functions, and not one only, namely, such means resist but do not prevent snoutward shifting of the fish prior to beheading, thereby imposing a drag on the snoutward shifting of the fish, and also restrain lifting of the fish during beheading, as well as prior and subsequent thereto. The two functions may be satisfactorily performed, however, by a single element.

In particular, while the presser means and the fish-positioning hoe are both mounted upon a common mount, so that they advance together, cooperatively with and at the same rate as the lugs that engage and advance the fish, they are independently movable lengthwise the fish, with respect to that mount and with relation to one another, to the end that the presser means exerts a drag upon the fish while it is being dragged snoutward by the hoe, and retains it in any adjusted position, and also causes the skin to be stretched more or less tightly, so that it does not bunch up under the hoe. Thus it functions to hold back the snoutwardly moving fish. Also the presser means continues to hold down the fish during and after the beheading operation, and also prior thereto whereas the hoe, before the beheading operation begins, and before the fish has quite advanced to the beheading point, begins to retract away from the beheading point, so that it is out of the path of the knife, and thus moves independently relative to the presser means, just before and at the time of the beheading action. Thus it functions to hold down the fish upon the table. It is convenient to combine these two functions in a single element.

After beheading, the presser device and the hoe are carried or guided back overhead and inverted to the feed end of the machine, and there are brought down, reinverted, and lowered properly into engagement with a succeeding fish, not necessarily nor desirably the next succeeding fish, but one later in the path of advance.

The feed table 9 supports several parallel feed chains 90, provided with spaced lugs 91, by means of which individual fish, resting directly upon the table, are fed without a pause lengthwise of the feed table from a feed end which is at the right in Figures 1 and 2, toward the beheading point B in those figures, and thence continue to a delivery point, which is at the left in Figures 1 and 2. The feed chains are supported upon two-part sprocket wheels (not shown) mounted in the feed table, the two parts whereof are relatively angularly adjustable as disclosed in patent No. 2,507,810 for example, and are driven in coordination with other mechanism by the drive indicated by the bevel gears 92 (see Figure 2).

While in the larger sense the positioning of the fish according to this invention is useful without regard to the specific character of the beheading knife, whether stationary, as in Patent No. 1,909,643 of May 16, 1933, to E. H. Waugh, or reciprocative, as in Waugh Patent No. 1,542,196 of June 16, 1925, or cylindrical and rotative, as in my Patent No. 2,507,810, or radial and rotative, as herein shown, the accuracy of the cut is best promoted, and the means to attain accuracy in the positioning of the fish are best utilized, in conjunction with a rotary knife. The use of a rotary knife, in conjunction with fish-advancing and fish-locating means herein disclosed, constitutes an important element in this invention.

A knife 8, properly contoured in radial axial section to follow the line of the pectoral girdle, and to cut back of it to remove the pectoral fins (see Figure 1) is rotatable, preferably upon a skew axis near the level of the table top, as designated by the shaft 80, which through the drive typified by the bevel gears 81 and 82, is timed and coordinated with the other driving and driven devices. Because it is desirable that the knife have appreciable mass and momentum, in order that its rapid rotation be not materially impeded by its passage through the fish, it is preferred that the knife be carried upon a flywheel 83. Its passage downward past the plane of the table defines the beheading point B. Because it is thus massive, it strikes each fish a heavy blow, and each is thereby induced by reaction to curl upwardly at head and tail, with results hereinafter referred to.

Contrary to the arrangement disclosed in certain of my patents, notably Patent No. 2,507,810, the fish does not rest upon a platform or any other element which itself is movable, with the fish, bodily transversely of the direction of the fish's advance, thereby to shift the fish or to drag it snoutward or tailward relative to the table. It has been found that the fish tends to stick to such a platform or support unless it continues to move thereover, and that distortions caused by imperfect positioning on such a support can not be corrected properly. Instead, each fish rests upon and moves always relative to the surface of the table 9, along which it is advanced by the feed chains 90 and a group of lugs 91, the groups being spaced lengthwise of the feed table. While it is immaterial, broadly speaking, by what means, passive or positive, the snoutward shifting of the fish transversely of the feed table is accomplished, actually I propose to do this in the present device by positively-acting mechanism which engages the fish from overhead, but again, contrary to my Patent No. 2,507,809, the engagement is by a hoe-like member which travels the full length of the feed table, and with which is associated a presser device, which likewise travels with the fish lengthwise of the feed table, but does not shift lengthwise the fish, and which serves to control its position and to restrain its movement at all times, before, during, and if need be, after beheading.

Chains 70, whereby the presser means and the fish-locating means are advanced, are supported by sprocket wheels 71 and 77 in an overhead framework 7, supported upon brackets 97, these chains 70 being driven in synchronization with other driven parts, and in particular at the same speed as the feed chains 9, by drive mechanism indicated by the bevel gears 72. The upper and lower runs of these chains are preferably supported, against deflection, by tracks 78, 79.

Fast to the feed chains 70 are brackets 6 and 60 (see, in particular, Figure 4), which are rigidly connected by a cross-bar 61, which constitutes a guide for a transversely slidable bar 62, and which supports a vertical guide 63 for a post 64 which is vertically disposed and slidable in all its operative positions. It will be understood that the guide 63 is not always vertically disposed, but it is so disposed except when it is rotating about the axis of the sprocket wheels 71 and 77, and hence can be distinguished and referred to as a vertical guide.

The transversely movable bar 62 carries, on the end which corresponds to the side of the feed table where the beheading point B is located, a vertical guide 65, in which moves a post 10 carrying at its lower end a thin hoe-like fish-engaging member 1. This hoe 1 has vertical movement, by reason of the post 10 moving upwardly and downwardly in the guide 65, and has also transverse movement by reason of the bar 62 sliding within the guide 61. Cam means or the like, shortly to be described, control these movements through the respective cam followers 11 on the post 10 and 66 on the bar 62, acting through appropriate slots.

A presser plate 2 of rather appreciable mass is carried at the lower end of the post 64, and thus has vertical movement with respect to the transverse guide 61, but has no transverse movement. The vertical movement of the presser plate 2 is not cam-controlled, but gravity-controlled, throughout its operative path, and the pin 21, projecting from the post 64, and sliding in the slot 67, merely defines the upper and lower limits of movement of the presser plate 2. The presser plate, on its side which is lower when the plate is operative (that is, on the surface which engages the top side of the fish), may be provided with ribs 22, which extend transversely of the fish and retard or hold back movement of the fish relative to the plate 2. Likewise the presser plate is provided with rollers 23, by means of which it rolls more freely relative to supporting and reversing cams 27a and 27b, to be described later.

The spacing of the brackets 6, 60, and their connecting guides 61, is identically the same as the spacing between the feed lugs 91, but their phase is sufficiently different that the hoe 1 and its associated presser plate 2 will come into proper engagement with a fish which is being advanced by the lugs 91 of a corresponding set, and as these lugs feed the fish forward towards the beheading point B, the fish, so advanced by each given set of lugs, is held down by the plate 2, and is advanced snoutward by the hoe 1, to such extent as to bring its pectoral girdle into correct registry with the beheading point, after which, and before arrival at the beheading point, the hoe 1 is withdrawn gradually upwardly and then tailwardly, out of the path of the knife 8, while the presser plate 2 continues to rest upon and hold down the fish, during and after the beheading operation.

A rib 98, parallel to the path of advance of the fish and of the hold-down plate 2, stands up from the table 9, and cooperates with the plate 2 in holding back the fish against excessive snoutward movement, and stretches its skin and flesh on its lower side, as the plate 2 stretches the skin and flesh on its upper side, while the fish is dragged snoutward by the hoe 1. The drag of these two elements is often sufficient to cause the fish's jaws to open, as it approaches the beheading point.

To accomplish the movements of the traveling and shifting elements, the cam follower 66, which controls transverse movement of the hoe 1, is engaged continuously with a cam track in channel shape, represented generally by the numeral 15. Almost from the feed end, in the lower run of the chains 70, the cam track 15 is inclined, as indicated by the portions 15a, in such manner as to advance the cam follower 66, and hence the hoe 1, snoutward with relation to the fish. The fish, which has been placed approximately in correct position upon the pre-feed portion 99 of the feed table, and which is picked up by a set of feed lugs 91, is thereby engaged at some point in the inclined portion 15a of the cam track by the hoe 1, which rests upon it and depresses its skin and flesh, and the thus-engaged fish is dragged snoutward by the hoe's engagement with the fish's submerged pectoral girdle, or similar bony excrescence, until such time as the straight portion 15b of the cam track is reached. At this time the hoe and the pectoral girdle of the fish have been shifted into precise linear registry with the knife's path at the beheading point B.

The straight portion 15b of the cam track terminates in advance of the fish's arrival at the beheading point, and the cam follower 66 now follows a steeply inclined reverse portion 15c, which withdraws the hoe tailward out of the path of the knife. Thereafter it follows the straight portion 15d for the remainder of the lower run of the chains 70, and for all of the upper run until it arrives again at the feed end of the feed table.

The cam follower 11 is free of restraint substantially from the time it reaches vertical position at the feed end 99 of the table, so that the hoe may drop downwardly and rest with all its weight, to whatever extent may be necessary to engage a fish, whatever may be the size of the latter, which is being fed forward by the lugs 91. After arrival of the hoe at the extreme snoutward limit of its transverse movement, that is, when the cam follower 66 has reached the short, straight portion 15b, there is no longer need for the hoe to rest upon the fish, but rather it is preferable that the hoe be lifted above the fish slightly in advance of the time that it is being retracted tailwardly. Accordingly an incline 16 (see Figure 2) supported from the overhead framework 7 is disposed in position to engage the cam follower 11, which controls vertical movement of the hoe 1. It is also shaped in plan to correspond to the shape of the cam track 15, and by this incline 16 the hoe is raised from fish-engaging position to an upraised position. After the hoe has been lifted clear of the fish, it is retracted tailward by the cam track section 15c. By the time the fish which is formerly engaged reaches the beheading point, the hoe 1, by its lifting and retraction, is wholly clear of any fish that would be sent through the machine, as may be seen at the left center in Figure 2, and of any possibility of engagement by the knife, as may be seen at the left in Figure 1. The hoe may be carried thus upraised by a horizontal extension of the incline 16, as is indicated in part at 16a in Figure 2, or it can be permitted to drop downwardly after the beheading point has passed, and the latter is the arrangement shown.

The dragging of the fish snoutward by the hoe 1 engaged behind its pectoral girdle tends to wrinkle the skin and distort the body more or less, according to the fish's condition. The drag upon the fish which is afforded by the hold-back plate 2 and rail 98 tends to minimize such wrinkling and distortion, and to control the positioning of the fish. By raising the hoe 1 from the fish after it has attained its position of correct alignment with the beheading point, but before its arrival thereat, opportunity is afforded for relieving some of the strains and distortions produced by the positioning. The location of the hoe-raising cam 16 to become effective while the hoe's cam follower 66 is within the straight "holding" portion 15b of its cam track effects this purpose. In particular, it will be noted that the hoe is not dragged rearwardly over the fish, for in some fish this would disturb its attained position. The lifting of the hoe, while the fish is still short, lengthwise of the table, of the beheading point, affords time for relaxation of skin wrinkles or flesh distortions, and improves the accuracy of the cut.

In order to maintain control over each presser plate 2 and hoe 1 as it is inverted in passing about the sprocket wheels 71 and 77, cams are provided. About the left-hand sprocket 77 a curved cam 17 is shown, to insure raising the hoe 1 by the follower 11 as the entire mechanism is inverted in passing about this sprocket 77. At the opposite sprocket 71, at the right in Figure 2, an extension of the cam 17, designated 17a, slopes gradually downwardly, so that the hoe will not merely fall of its own weight, as it is again inverted, but will be let down gently until the hoe rests upon and engages a newly fed fish.

The presser plate 2 is also raised positively as it is inverted in passing over the left-hand sprocket wheel 77, and as it reinverts and passes about the right-hand sprocket wheel 71. A cam 27a is positioned to engage the rollers 23 at the delivery end of the feed table, to effect gradual inversion of the presser plate 2, and a cam 27b at the feed end of the feed table permits gradual reinversion of the presser plate. A terminal section 27c, hinged at 27d, hangs downwardly close to the surface of the table 9 or its initial portion 99, so that the presser plate 2 is supported until it is in its full lowered position, particularly if there is no fish in position for it to engage, but this hinged terminus 27c may swing upwardly as a fish passes beneath it, and still the presser plate is let down gently upon the fish.

It is believed the operation of the device will be reasonably clear. Fish are advanced to or along the initial portion 99 of the feed table singly by any suitable means, and since the means to this end are no part of the present invention, and will be disclosed in a companion application, none have been shown herein. Each fish advances lengthwise of the feed table by means of the lugs 91, and it will be seen from Figure 1 that these lugs are not necessarily nor ordinarily aligned transversely of the table, but are arranged and adjusted initially in a curved pattern which generally conforms to the belly shape of the fish. The lugs, then, engage the individual fish and advance each one uninterruptedly lengthwise of the table. As each fish comes beneath the right-hand or feed end sprocket wheel 71 a presser plate 2 comes down to rest upon it, and the hoe 1, retracted behind the fish's pectoral girdle, also comes down to rest upon the fish, and by its weight depresses the skin and flesh of the fish. Almost immediately, as the fish continues its advance, the hoe moves snoutward as the cam follower 66 enters the long incline 15a of its cam track. Eventually the hoe engages behind the pectoral girdle of the fish, and effects snoutward shifting of the fish, uninterruptedly, until such time as its pectoral girdle is in correct linear alignment with the beheading point, as is the fish immediately to the right of he beheading point in Figure 1. The force exerted by the hoe is sufficient, applied to the pectoral girdle, to cause the fish's jaws to open, to a slight degree distorting the fish and its skin, but this distortion is somewhat relieved by lifting of the hoe from the fish before the fish reaches the beheading point. To the extent that it may not be relieved, it urges the good flesh tailward from between the gill covers, and both increases the usable flesh left on the fish and decreases the bony area. Impact of the knife with fish also squeezes the flesh rearwardly from between the gill covers. Whatever the cause, or whichever cause predominates, the effect is a slightly concave cut within the head, though of course the knife follows a circular planar path, and such concavity can only result from some distortion and subsequent relaxation of the flesh, as the knife passes therethrough. All this time the plate 2 has been resting upon the fish and retarding, or to a degree resisting, its snoutward movement effected by the hoe, and it serves to restore the flesh and skin to its relaxed position, once the strains upon it are relieved by removal of the hoe.

To digress at this point, it may be noted that if the fish happens to be soft and flabby, the snoutward movement of the hoe might tend to gather the skin very appreciably in advance of it, and to interpose too great a thickness of flesh and skin between itself and the pectoral girdle, thereby displacing the fish too far snoutward. Such a condition would tend also to distort the flesh, perhaps to curl upwardly the tail of the fish, even to a sufficient extent to disturb its feed engagement with the lugs 91, and to cause it to lie askew on the feed table. The drag and pressure of the presser plate 2 and rail 98 tends to, and in most cases does, completely eliminate these sources of error. The drag on the skin materially lessens its wrinkling, and holds down the body and tail portion of the fish. The result is, the hoe correctly engages behind the pectoral girdle, notwithstanding the flabbiness of the fish, and thereby locates the fish as accurately as it does a firm, fresh fish. Such a fresh fish, likely to be bodily displaced easily, is held firmly against undue displacement.

After the fish has been shifted snoutward into proper linear registry with the beheading point, and the hoe has been lifted and retracted tailward, and the fish advances slightly farther, the knife will pass through the same position that was occupied by the hoe, that is, immediately behind the pectoral girdle. In fact, a portion of the knife will extend tailward thereof, in order to cut out the pectoral fin, which is immediately to the rear of the throat. The still-advancing fish, notwithstanding, continues to be held down by the presser plate 2, which resists the reaction of the body to the shock of the beheading knife, and which continues to act during and after the beheading operation.

Without this continuous pressure upon the body of the fish it has been found in some instances, where the fish is particularly rigid, that the fish will be dragged snoutward or sidewise by the action of the beheading knife, or by the impact of the knife with the fish the latter will even be flipped up from the feed table, and may cause a jam. At the very least the accuracy of the cut is destroyed, and at the worst a shut-down of the feed table and destruction of one or more fish is a probability. With the continuous pressure of the presser plate, however, such accidents are eliminated, and the fish is held steady until it is delivered from the feed table for delivery to the fish-dressing machine proper.

Heretofore it has been considered preferable (see my Patent No. 2,346,935 of April 18, 1944) to pierce the fish along the neck line of severance simultaneously with several points of the rotary beheading knife, the purpose of this being to define and establish the beheading line while the fish was correctly positioned, and thereafter such displacement of the fish as might be caused by its feeding forward, or for reasons suggested above, would not affect the line of beheading. Remembering that the feed rate has been materially increased, it has been found that the displacement of the fish by the lugs during the time required for the knife to pass through the fish, which results from the greater feed rate, actually becomes so great as to destroy the accuracy of the beheading cut, and consequently it is now necessary to devise other means for insuring the retention of the accuracy of the cut, which accuracy was attained by the mechanism heretofore described. In other words, it is futile to locate the fish accurately, and then, in the course of the beheading process, to destroy that accuracy. The beheading operation must itself be as accurate as the locating of the fish was accurate preceding the beheading operation. The means for so doing is concerned with the shape and arrangement of the knife relative to its locus and the locus of the fish, and is best illustrated in Figures 5 to 8, inclusive.

The knife 8 and the feed lugs 91 are so synchronized by their common drive that a point 85 of the knife, being the one which is radially inward of all other points, first engages the fish F as it arrives at the beheading point, and its engagement is along a path which will carry it slightly behind the backbone of the fish, represented at f. As rotation of the knife and advance of the fish F continue, a second point 86 penetrates the fish, but the fish's advance is sufficiently rapid, and the increasing curvature of the edge 88 is so nearly coincident with the locus of the advancing fish, adjacent the point 85 at least, that the edge 88 still lies just behind or hooked over the backbone f. By now, as seen in Figure 6, severance of the head is well advanced.

Now as rotation of the knife continues, the throat portion of the edge 88 slopes somewhat more steeply than is sufficient to coincide with the advance of the fish, but the backbone f, being very tough and strong at this point where it joins the head, by its resistance to severance causes the fish to be pulled forwardly ahead of the feed lug 91, as is shown in Figure 7, so that by the time the severance of the head is completed, or nearly so, and during the time that accuracy of location is most essential, the fish has been drawn forward slightly, so that the advance of the lugs cannot disturb its position; and only now, as the feed lug 91 begins to catch up again with the fish, is final severance completed, as shown in Figure 8, when the bottom of the curvature of the edge 88 finally forces its way through the backbone f.

At about this time the edge 87 hooks down outside the throat tendons, where the fish's head joins the body immediately below the gills, and notwithstanding broadening of the fish caused by the squeezing to which it is subjected, insures severance of this usually troublesome portion of the head, for the tendons cannot escape from the outside hooked portion of the knife.

Thus, by the use of this style of knife in such a fish-dressing machine, it will be seen that the knife engages the fish by successive penetration at at least two points; that the innermost of these points hooks over the backbone and eventually jumps the fish ahead of the feed lugs to a slight degree, somewhat exaggerated in Figure 7, and thereby insures severance of the head with the least disturbance of its accuracy of position. It will be seen also that the severance of the tendons at the throat is assured, all to the end that the head is certainly and accurately severed from the body without interruption of the fish's advance, and during the single rapid passage of the beheading knife past the beheading point.

I claim as my invention:

1. The method of beheading fish which comprises positively advancing successive fish while each is disposed flatwise and all with their heads in the same direction, along a predetermined path which is transverse to their length, to and beyond a definitely located beheading point; at such beheading point severing the head from the fish's body immediately behind its pectoral girdle, in synchronism with and during its advance; and applying a restraining force to each fish's body portion prior to and continuing through the beheading operation, to restrain displacement of such body portion during incidence of forces other than the advancing force, and during continuance of such restraining force.

2. The method of claim 1, characterized in the application to the fish, in the vicinity of its pectoral girdle, and during its advance towards the beheading point, of a snoutwardly directed force to shift such fish in such direction, and further characterized in that the restraining force resists but does not prevent such snoutward shifting.

3. The method of claim 1, characterized in advancing the reaction point of the restraining force in synchronism with and at the same rate as the advance of the corresponding fish.

4. The method of claim 1, characterized in that the restraining force includes at least two components, one resisting snoutward shifting of the fish, and the other restraining lifting of the fish.

5. The method of claim 1, characterized in that severance of the head is accomplished during continuance of the fish's advance, and by engagement and application of a displacing force behind the fish's backbone, to draw the fish's head ahead of its normally advancing position at initiation of severance.

6. The method of beheading fish which comprises applying to successive fish, while they are disposed flatwise, in parallel spaced relation, and all with their heads in the same direction, an upwardly directed supporting force and an opposed downwardly directed pressing force originating in a single effective point of application located above the fish; advancing said fish, while subjected to such opposed forces, along a path directed transverse to their length, to and past a beheading point; advancing the effective point of application of the downwardly directed force in consonance with and in parallelism to the path of such advance; and severing the head from the fish's body immediately behind its pectoral girdle while the fish is advancing, with its body portion so subject to the supporting and pressing forces, through the beheading point.

7. The method of beheading set forth in claim 6, characterized in shifting each fish, as it advances towards the beheading point, bodily in the direction of its length, in opposition to the drag of its pressing force until it is in correct alignment with the beheading point.

8. The method of beheading set forth in claim 6, characterized in that beheading is initiated by piercing the fish, as it arrives at the beheading point, behind its backbone, and simultaneously applying to the backbone a force acting forwardly in the direction of its advance, to displace forwardly the neck portion relative to the body portion, and completing the severance of the head at about the time when the still-advancing body portion catches up with the forwardly displaced neck portion.

NORFORD L. OATES.

REFERENCES CITED

The following references are of record in the file of this patent:

UNITED STATES PATENTS

| Number | Name | Date |
|---|---|---|
| 1,222,926 | Brierly et al. | Apr. 17, 1917 |
| 1,294,609 | Boone | Feb. 18, 1919 |
| 1,506,719 | Thuau | Aug. 26, 1924 |
| 1,546,975 | Feller | July 21, 1925 |
| 1,643,504 | Lea | Sept. 27, 1927 |
| 1,893,903 | Mullins | Jan. 10, 1933 |
| 1,967,229 | Drevitson | July 24, 1934 |
| 2,203,566 | Gibbs | June 4, 1940 |
| 2,234,658 | Smith | Mar. 11, 1941 |
| 2,346,935 | Oates | Apr. 18, 1944 |
| 2,413,383 | Savrda | Dec. 31, 1946 |
| 2,423,174 | Brown | July 1, 1947 |
| 2,507,808 | Oates | May 16, 1950 |
| 2,507,809 | Oates | May 16, 1950 |
| 2,507,810 | Oates | May 16, 1950 |